(12) United States Patent
Pfeilschifter et al.

(10) Patent No.: US 11,794,597 B2
(45) Date of Patent: Oct. 24, 2023

(54) ON-BOARD VEHICLE ELECTRICAL SYSTEM HAVING AN ACCUMULATOR, AN ALTERNATING VOLTAGE CONNECTION AND A DIRECT VOLTAGE CONNECTION

(71) Applicant: Vitesco Technologies GMBH, Hannover (DE)

(72) Inventors: Franz Pfeilschifter, Regensburg (DE); Martin Götzenberger, Ingolstadt (DE)

(73) Assignee: Vitesco Technologies GmbH, Hannover (DE)

( * ) Notice: Subject to any disclaimer, the term of this patent is extended or adjusted under 35 U.S.C. 154(b) by 142 days.

(21) Appl. No.: 17/405,483

(22) Filed: Aug. 18, 2021

(65) Prior Publication Data

US 2021/0380002 A1    Dec. 9, 2021

Related U.S. Application Data

(63) Continuation of application No. PCT/EP2020/054192, filed on Feb. 18, 2020.

(30) Foreign Application Priority Data

Feb. 21, 2019  (DE) .................... 10 2019 202 345.2

(51) Int. Cl.
*B60L 53/10*    (2019.01)
*B60L 53/20*    (2019.01)
(Continued)

(52) U.S. Cl.
CPC .............. *B60L 53/11* (2019.02); *B60L 1/006* (2013.01); *B60L 53/14* (2019.02); *B60L 53/20* (2019.02)

(58) Field of Classification Search
CPC .......... B60L 53/11; B60L 1/006; B60L 53/14; B60L 53/20; B60L 53/24; B60L 2210/10;
(Continued)

(56) References Cited

U.S. PATENT DOCUMENTS 7,880,326 B2   2/2011   Khan et al.
9,472,365 B1  10/2016   Lopez et al.
(Continued)

FOREIGN PATENT DOCUMENTS

| DE | 102006000796 A1 | 8/2006 |
|---|---|---|
| DE | 102017212496 A1 | 1/2019 |
| DE | 102017213682 A1 | 2/2019 |

OTHER PUBLICATIONS

TDK AllgemeineTechnische Informationen Munchen. Feb. 2014, S. 16-81, Firmenschrift https://www.tdk-electronics.tdk.com/download/433954/a7c1529e38398c3082191bbea33b658/pdf-general.pdf (abgerufen am Apr. 27, 2020).

(Continued)

*Primary Examiner* — Paul Dinh

(57) ABSTRACT

An on-board vehicle electrical system is provided with a rechargeable battery, an AC voltage connection and a DC voltage connection. The DC voltage connection is connected directly to the rechargeable battery via a connection point. The AC voltage connection is connected to the rechargeable battery via a rectifier and a first switch via the connection point. The rectifier is connected to the rechargeable battery via a DC-isolating DC/DC converter and a second switch. The second switch is connected to the rechargeable battery via the connection point. There is at least one consumer on-board electrical system branch, which includes a Cy capacitance and which is connected to the rechargeable battery via the second switch.

11 Claims, 1 Drawing Sheet

(51) Int. Cl.
*B60L 53/14* (2019.01)
*B60L 1/00* (2006.01)

(58) Field of Classification Search
CPC ..... Y02T 10/70; Y02T 10/7072; Y02T 90/14; B60Y 2200/91
USPC ........................................................ 320/109
See application file for complete search history.

(56) References Cited

U.S. PATENT DOCUMENTS

2017/0036555 A1* 2/2017 Albanna ................. B60L 53/14
2019/0036366 A1* 1/2019 Dohmeier ............... B60L 53/24
2020/0180453 A1 6/2020 Pfeilschifter et al.

OTHER PUBLICATIONS

Leistungselektronik—Bauelemente Grundkurs, Schaltungen und Systeme. 7. aktualisierte und überarbeitete Auflage, S. 327-344, ISBN 978-3-658-03309-5 https://link.springer.com/book/10.1007/978-3-658-03309-5 (abgerufen am Apr. 27, 2020).
Bosch Autoelektrik und Autoelektronik—Bordnetze, Sensoren und elektronische Systeme. 6. uberarbeitete und erweiterte Auflage, Vieweg + Teubner, S. 1-4, S. 502-508, ISBN 978-3-8348-9902-6 https://link.springer.com/book/10.1007/978-3-8348-9902-6 (abgerufen am Feb. 11, 2019).
German Office Action dated Feb. 21, 2019 for corresponding German Patent Application No. 102019202345.2.

* cited by examiner

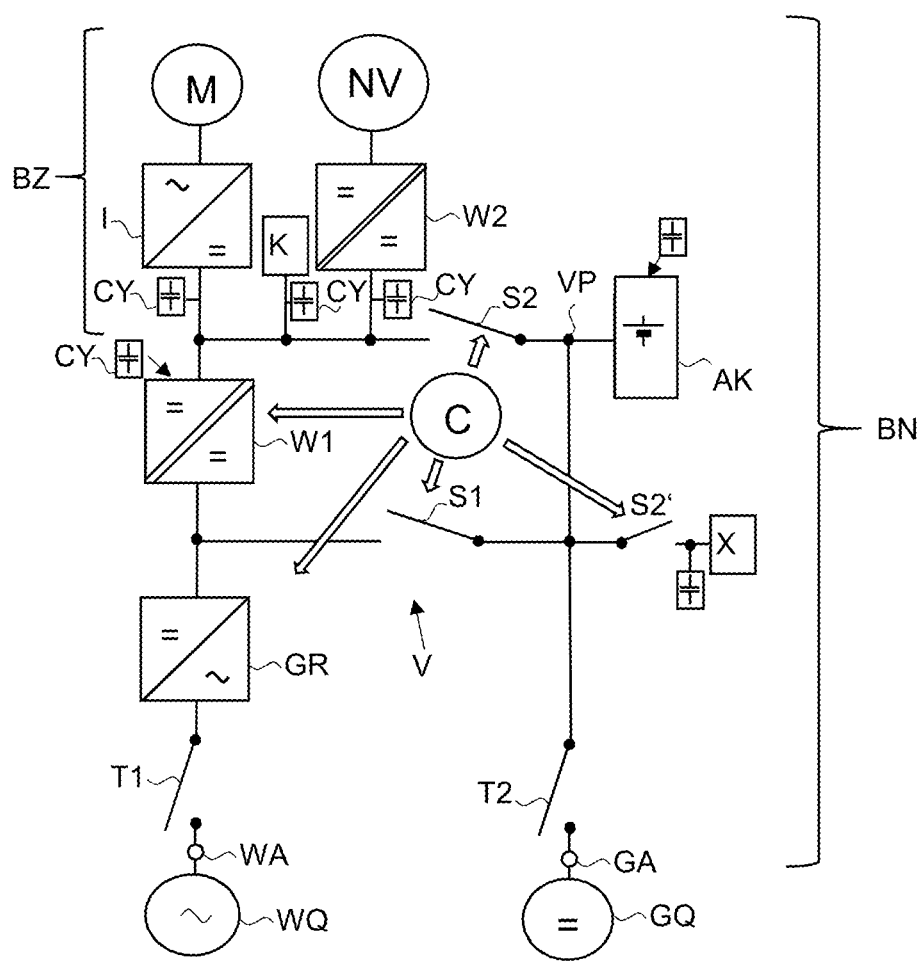

ON-BOARD VEHICLE ELECTRICAL SYSTEM HAVING AN ACCUMULATOR, AN ALTERNATING VOLTAGE CONNECTION AND A DIRECT VOLTAGE CONNECTION

CROSS-REFERENCE TO RELATED APPLICATIONS

This application claims priority to PCT Application PCT/EP2020/054192, filed Feb. 18, 2020, which claims priority to German Patent Application No. DE 10 2019 202 345.2, filed Feb. 21, 2019. The disclosures of the above applications are incorporated herein by reference.

FIELD OF THE INVENTION

Vehicles have an on-board vehicle electrical system for numerous electrical components. In vehicles having components with a high electrical power, such as vehicles having an electric drive, there is a high-voltage on-board electrical system via which a high-voltage rechargeable battery is charged and which has a high-output load, such as a high-voltage electric drive.

BACKGROUND OF THE INVENTION

When charging, it must be ensured that no dangerous contact voltages occur, and, in particular, that energy stores within the on-board electrical system cannot lead to dangerous contact voltages if they are still charged. On the other hand, when operating the loads, it is necessary to prevent faults caused by clocked switching of the loads during their operation from causing other components to malfunction. EMC filters that have an energy store (namely a Cy filter capacitor) to damp this interference are used for this purpose. As mentioned, these energy stores are in the form of a dedicated or discrete component or may be implemented by parasitic Cy capacitances. A Cy capacitance is a parasitic capacitance or is implemented by a filter component. A Cy capacitance capacitively connects a supply voltage potential to a ground potential.

SUMMARY OF THE INVENTION

It is an object of the invention to implement, in a simple manner, an operation of the on-board vehicle electrical system that is both harmless and non-disruptive during charging and during driving.

This object is achieved by the on-board vehicle electrical system described. Further features, embodiments, and properties are found in the description and the FIGURE.

It is proposed to connect an AC voltage connection of the on-board vehicle electrical system, which is used to charge via AC voltage, to a downstream rectifier, which is connected to a rechargeable battery of the on-board vehicle electrical system via a first switch, and which is likewise connected to the rechargeable battery via a DC-isolating DC/DC converter and a second switch. The switches are used to select whether the rectifier is connected to the rechargeable battery directly (that is to say without a converter) or via the DC/DC converter. In the first case, the second (open) switch is used to disconnect a load with a Cy capacitance from the rechargeable battery and thus from the AC voltage connection, which is supplied with power by the DC/DC converter. Since the DC/DC converter is DC-isolating, a dangerous contact voltage cannot be transmitted via the converter. In the second case, the (open) first switch is used to achieve the disconnection; here too, the DC-isolating DC/DC converter enables the Cy capacitance to be disconnected from the AC voltage connection. In the second case, the load is supplied with the voltage with which the rechargeable battery is charged.

Finally, DC voltage charging is possible by a DC voltage connection that is connected (directly) to the rechargeable battery. Here, the (open) second switch (and, if applicable, the DC-isolating DC/DC converter) is used to disconnect the Cy capacitor from the DC voltage connection. A first switch (then closed) is used to supply power to the load via the DC-isolating DC/DC converter without the Cy capacitor being able to transmit too high a contact voltage to the DC voltage connection. The connection of the first and second switch via a connection point that is connected to the rechargeable battery (and to which the DC voltage connection is connected) results in a circuit topology that makes possible a voltage supply to the load during charging and when driving as well as contact voltage protection based on the Cy capacitor.

The load is an exemplary example of the consumer on-board electrical system branch or of a component in this on-board electrical system branch. The consumer on-board electrical system branch is supplied with power by the on-board vehicle electrical system, wherein the branch is disconnected from the AC voltage and/or DC voltage connection with regard to the DC voltage of an energy store within the consumer on-board electrical system branch.

An on-board vehicle electrical system having a rechargeable battery, an AC voltage connection and a DC voltage connection is proposed. The two connections are used to charge the rechargeable battery and, if necessary, also for feedback in the case of a bidirectional design. The AC voltage connection and the DC voltage connection in an embodiment are designed in accordance with a standard for charging plug-in vehicles. The two connections may be provided in a common connection device.

The DC voltage connection is connected directly to the rechargeable battery via a connection point. The term "direct" means that the connection is converter-free and, in an embodiment, does not have a switch (that is to say it is switch-free). A direct connection may have a filter or a safety mechanism, but is designed without a converter, that is to say without a DC/DC converter and without a rectifier or inverter.

The AC voltage connection is connected to the rechargeable battery via a rectifier and a first switch via the connection point. In an embodiment, the AC voltage connection is connected to the rectifier directly or via a first disconnecting switch. The connection between the AC voltage connection and the rectifier in an embodiment is converter-free. The rectifier is connected directly to the first switch. The first switch is connected directly to the connection point. The connection point itself is connected directly to the rechargeable battery. As a result, there is a converter-free connection between the rectifier and the connection point or the rechargeable battery via the first switch. Another connection between the AC voltage connection and the connection point or the rechargeable battery, which leads via a DC/DC converter, is described in the following text.

The rectifier is connected to the rechargeable battery via a DC-isolating DC/DC converter and a second switch. In this case, the second switch is connected directly to the rechargeable battery via the connection point. The converter is likewise connected directly to the second switch. The DC/DC converter is connected directly to the rectifier. This therefore results in a further connection path between the connection point and the rectifier, which leads via the DC/DC converter (and via the second switch).

The on-board vehicle electrical system has at least one consumer on-board electrical system branch. The branch has a Cy capacitance. The consumer on-board electrical system branch is connected to the rechargeable battery via the second switch. The at least one consumer on-board electrical system branch is connected, for example directly, to the DC/DC converter. The DC/DC converter thus connects the rectifier to the consumer on-board electrical system branch in a DC-isolating manner.

The rechargeable battery (or the connection point) is connected to the consumer on-board electrical system branch via the second switch. The DC voltage connection is connected (via the connection point) to the at least one consumer on-board electrical system branch via the second switch. As a result, the second switch is used to disconnect the Cy capacitance of the consumer on-board electrical system branch from the connection point, with the result that the Cy capacitance is disconnected when power flows from the AC voltage connection via the rectifier (and the first switch) to the rechargeable battery. When the second switch disconnects the rechargeable battery from the consumer on-board electrical system branch, the consumer on-board electrical system branch is supplied with power via the converter.

The consumer on-board electrical system branch in an embodiment has a traction drive on-board electrical system branch. This is provided with an electric machine. It is also provided with an inverter. In an embodiment, the electric machine is connected to the second switch via the inverter. If the second switch is closed, energy is transmitted from the rechargeable battery to the electric machine (via the inverter). In the case of a regenerative design, energy is also transmitted from the electric machine to the rechargeable battery via the second switch. Since during driving, that is to say when the electric machine is active, the AC voltage connection and the DC voltage connection are necessarily disconnected from external electrical systems and the vehicle is moving, the Cy capacitor presents no or only a limited risk with regard to contact voltage. Further consumer on-board electrical system branches that are connected at the same point may include an electrical heating device, an electrical air conditioning compressor, a low-voltage DC/DC converter or else other loads that have Cy capacitors. Due to the same connection, these Cy capacitances may be disconnected from the AC voltage connection and the DC voltage connection by the second switch.

The rectifier may be connected to the AC voltage connection via a first disconnecting switch. The connection point may be connected to the DC voltage connection via a second disconnecting switch. As a result, in the event of a fault, the connections mentioned are disconnected from the remaining on-board electrical system (by opening the corresponding disconnecting switch).

The on-board vehicle electrical system in an embodiment has a controller, which is connected in a controlling manner to the first switch and the second switch. The controller is set up, in a first state, to control the first switch in an open state and to control the second switch in a closed state. In this first state, the AC voltage connection is disconnected from the Cy capacitors via the first switch. In the first state, the second disconnecting switch and/or the first disconnecting switch may also be open. In the first state, the second switch connects the rechargeable battery to the consumer on-board electrical system branch, with the result that energy may flow between the rechargeable battery and consumer on-board electrical system branch. This connection is then DC-connecting. The first state is thus a traction or recuperation state. In such a state, the first disconnecting switch is open.

Furthermore, the first state may also be a charging state, in which the rectifier is connected to the consumer on-board electrical system branch via the DC-isolating DC/DC converter. Furthermore, in the first state (as charging state), the rectifier is connected to the rechargeable battery (via the second switch) via the DC/DC converter. As a result, energy is transmitted to the rechargeable battery in a DC-isolated manner, while the consumer on-board electrical system branch, for example, is also supplied with power by the DC/DC converter. If the second state is a charging state, then the first disconnecting switch is closed. The open first switch makes it possible for the rechargeable battery to be charged via the AC voltage connection, with the AC voltage connection being disconnected from the Cy capacitance of the consumer on-board electrical system branch via the open first switch (at least with regard to DC voltage transmission), since the DC/DC converter is DC-isolating. The controller is also set up, in a second state, to control the first switch in a closed state and to control the second switch in an open state. In this case, the consumer on-board electrical system branch and thus also the Cy capacitance thereof may be decoupled from the AC voltage connection by the second switch since, as mentioned, the DC/DC converter is DC-isolating. In this second state, the AC voltage connection is connected directly to the rechargeable battery via the rectifier and thus transmits energy to the rechargeable battery without converting DC voltage. The second state is thus a DC/DC converter-free charging state, while the first state, if configured as a charging state, is a DC/DC converter-based charging state.

In one embodiment, the controller is also set up, in a third state, to control the first switch in an open or closed state and to control the second switch in an open state. In this third state, the rechargeable battery is charged via the DC voltage connection GA, since in this third state, the second disconnecting switch, that is to say the disconnecting switch between the DC voltage connection and the rechargeable battery, is closed. The controller is set up to control the first and/or the second disconnecting switch. If the first switch is open in the third state, then DC voltage is transmitted to the rechargeable battery via the DC voltage connection (in the sense of a direct DC voltage charging state), the DC voltage on-board electrical system branch being disconnected from the DC voltage connection via the first and the second switch. In this state, energy is transmitted via the DC/DC converter to the consumer on-board electrical system branch via the AC voltage connection, this being done in a DC-isolating manner. Due to the open switch, the Cy capacitance of the consumer on-board electrical system branch is thus disconnected from the DC voltage connection, while at the same time the consumer on-board electrical system branch is supplied with power via the DC-isolating DC/DC converter without the Cy capacitors thereof being DC-connected to the AC voltage connection (or the DC voltage connection).

If the first switch is closed and the second switch is open in the third state, then DC voltage is transmitted to the rechargeable battery via the DC voltage connection, while energy is transmitted to the rechargeable battery via the AC voltage connection and the rectifier at the same time. This corresponds to a combined charging operation (AC voltage and DC voltage in combination). Here, too, the Cy capacitance is disconnected from the connections (DC voltage connection and AC voltage connection) via the open second switch, while the DC-isolating DC/DC converter enables the consumer on-board electrical system branch to be supplied with power in a DC-isolating manner. In the third state, the second disconnecting switch is closed, such that energy is transmitted from the DC voltage connection to the rechargeable battery, or vice versa. The third state thus corresponds to a DC voltage charging state. The second disconnecting switch may also be referred to as a DC voltage charging disconnecting switch. The first disconnecting switch may also be referred to as an AC voltage charging disconnecting switch.

The rectifier may be of single-phase or three-phase design. Furthermore, the rectifier may be designed to work either in a single-phase or three-phase manner. In this way, for example, a charging voltage of 400 volts or 800 volts is provided for the rechargeable battery. In a DC voltage charging state, corresponding to the third charging state, the first switch may be closed so that the consumer on-board electrical system branch is supplied with power from the DC voltage connection via the first switch and the DC/DC converter. Since the second switch is open, a different DC voltage results at the rechargeable battery or at the connection point than at the consumer on-board electrical system branch, with the result that two different nominal voltages may be set. If the second switch is closed in the third state, the consumer on-board electrical system branch receives the same voltage as the rechargeable battery, it being possible for a nominal charging voltage, for example, to be provided as nominal voltage.

The controller in an embodiment is also set up to detect a charging state. In an embodiment, the controller is set up to detect a charging state by detecting whether a cable to an external unit is plugged into the AC voltage connection, the DC voltage connection or both connections or whether a voltage that is greater than a predetermined voltage threshold value is present at one of the connections. In an embodiment, the controller is set up to detect a charging state in that it is detected whether a charging valve or a charging connection of a charging device is open.

The controller is set up to control the second switch in an open state when a charging state is present. As a result, the Cy capacitance of the consumer on-board electrical system branch is (DC-) isolated from the DC voltage connection and the AC voltage connection. The controller may also be set up to control the second switch in a closed state when no charging state is present. The controller may be set up to provide the closed state for the second switch when there is a supply state for the consumer on-board electrical system branch in which it is to be supplied with voltage. The second switch is controlled in the closed state when there is no state and when a traction drive of the vehicle (i.e., in the consumer on-board electrical system branch) is active. The second switch is controlled in the closed state when the vehicle is moving, when the vehicle is accelerating or when the vehicle is braking. The second switch is controlled in the closed state when there is no voltage at the DC voltage connection and the AC voltage connection or when a charging valve of a charging device, with which the two connections are associated, is closed. As a result, on the one hand, the supply of power to the consumer on-board electrical system branch is ensured and, on the other hand, it is ensured that the Cy capacitance thereof has no electrical connection to the DC voltage connection and the AC voltage connection, if these are occupied.

The controller may also be connected in a controlling manner to the DC/DC converter. In this case, the controller is set up to control the DC/DC converter in the first state in accordance with a nominal charging voltage. Any desired nominal charging voltage may be used here, the value of which comes from a rechargeable battery monitoring unit. For this purpose, the controller has an input, which is connected to a corresponding output of the device and which emits a signal reproducing the nominal charging voltage. Provision is made for the controller to control the DC/DC converter to output a voltage that is as close as possible to the nominal charging voltage when the second switch is closed. The DC/DC converter may in this case have an input at which a value that corresponds to a nominal voltage is received. The controller is connected in a controlling manner to this input and accordingly emit to this input a signal that reproduces the nominal charging voltage. As an alternative or in combination with this, the controller is set up, in the second state, generally with the second switch open, to control the DC/DC converter in accordance with a nominal supply voltage. Due to the open second switch, the on-board electrical system power supply branch is thereby controlled separately from the rechargeable battery via the DC/DC converter. As a result, a component of the on-board electrical system power supply branch may specify a nominal voltage in the form of the nominal supply voltage, as a value (or as a signal) in order to control the DC/DC converter in accordance with this nominal voltage. This is the case when the AC voltage connection is occupied and voltage is generated via the rectifier on the side of the converter that faces the rectifier. The first and second states mentioned here relate, in an embodiment, to an AC voltage charging state in which the AC voltage connection is used for charging, while the DC voltage connection is disconnected.

In the third state, such as when the DC voltage connection is used for charging, provision is made for the controller to control the DC/DC converter in accordance with the nominal supply voltage. The controller is set up to control this accordingly.

Provision may also be made for the rectifier to be able to be controlled. The controller may be connected in a controlling manner to the rectifier. The controller is set up to control the rectifier in accordance with a nominal charging voltage and to control the DC/DC converter in accordance with a nominal supply voltage. The voltages may be different. As a result, for instance when the first switch is closed and the second switch is open, a nominal supply voltage is provided for the on-board electrical system supply branch, which is determined by the controller and converted by the DC/DC converter, while a nominal charging voltage is specified by the controller and converted by the rectifier that supplies this voltage to the rechargeable battery via the closed first switch. This relates, in an embodiment, to an AC voltage charging state during which the AC voltage connection is active and the DC voltage connection is inactive and is disconnected.

As mentioned, the rectifier is a controllable rectifier, and in an embodiment is a controllable rectifier of multiphase design. The rectifier may be a bridge rectifier or it may be implemented as a power factor correction filter, for example as a Vienna filter. When implemented as a power factor correction filter, the rectifier is set up to also perform a step-up function and is able to generate a voltage above the rectifying peak voltage. For this purpose, the rectifier designed as a power factor correction filter has a temporary storage element, per phase, for instance an inductance (where appropriate per phase). The rectifier thus includes switching elements, which are controlled by an external signal, that is to say which are at least guided with current, but which is signal-guided, and in an embodiment is voltage-guided. The rectifier includes switching elements that may be designed, in an embodiment, as semiconductor switches, for instance IGBTs, MOSFETs or thyristors.

The DC/DC converter also includes such semiconductor switches, at least some of them. The DC/DC converter also includes a temporary energy store such as a coil. The DC/DC converter may be designed to be unidirectional or bidirectional. The DC/DC converter may also be designed as a step-up converter, synchronous converter or step-down converter.

The DC/DC converter is connected to the rechargeable battery via the second switch. The DC/DC converter is connected to the connection point, in an embodiment, via the second switch. The rectifier is connected to the rechargeable battery via the first switch. Thus, the second switch is provided between the connection point and the DC/DC converter, via which switch, viewed from the connection point, the consumer on-board electrical system branch may be disconnected from the rechargeable battery or from the AC voltage and DC voltage connections. The consumer on-board electrical system branch is DC-isolated on both sides, namely on the one hand in a switchable manner via the second switch and on the other hand at the other end via the DC-isolating DC/DC converter. The DC/DC converter is located between the connection point and the rectifier. As a result, the connection between the DC voltage connection and the connection point is not disconnected by either the first or the second switch. In an embodiment, neither the first nor the second switch is located between the DC voltage connection and the connection point or the rechargeable battery. A (second) disconnecting switch is provided between the DC voltage connection and the connection point, this being able to be opened and closed separately from the first switch. A (first) disconnecting switch between the AC voltage connection and the rectifier makes it possible for the rectifier to be disconnected from the AC voltage connection.

The consumer on-board electrical system branch may have an electric traction drive. This is provided with an electric machine. In an embodiment, the traction drive also includes an inverter. The inverter connects the second switch to the electric machine. The electric machine may thereby be operated via the second switch by the rechargeable battery. The traction drive drives the vehicle in which the on-board vehicle electrical system is provided. It is therefore possible to provide a vehicle having the on-board vehicle electrical system and having wheels that are connected in a torque-transmitting manner to the traction drive, such as to the electric machine thereof. Both the inverter and the electric machine have Cy capacitances, which are present as parasitic capacitances and/or which may be provided as dedicated capacitors of a filter. The consumer on-board vehicle electrical system branch may also have other components or consumers that have operating capacitors constructed as parasitic capacitances or as dedicated, discrete filter capacitors. A second consumer on-board electrical system branch is provided, which is connected to the connection point VP via a further switch. This has the same function as the second switch, but is operated separately from the second switch in order to connect specific consumers to the connection point or to disconnect them from it. This further switch is open when a charging state is provided.

The rechargeable battery may be designed as a high-voltage rechargeable battery. In an embodiment, the rechargeable battery is a lithium-based rechargeable battery. The rechargeable battery thus has a voltage of at least 350, 400, 600 or 800 volts. Furthermore, the rechargeable battery may be formed in multiple parts and be provided with a configuration circuit that connects the multiple parts of the rechargeable battery in series or serially (depending on the selection). Reference may thus be made to the voltage existing at the connection point. In an embodiment, the configuration circuit of the rechargeable battery may configure the rechargeable battery depending on a nominal charging voltage, a voltage at the connection point, or a number of active phases of the rectifier.

As mentioned, the rechargeable battery may be formed in multiple parts. For this purpose, the rechargeable battery has a configuration circuit. The cells of the rechargeable battery are in an embodiment divided into different cell groups. Because of the configuration circuit, the different cell groups may optionally be connected to one another in parallel or in series. The cell groups correspond to the parts of the aforementioned multi-part rechargeable battery.

There may be an additional on-board electrical system that has a Cy capacitance. The additional on-board electrical system is connected to the connection point via an additional switch of the on-board electrical system BN.

The controller may be designed for a charging sequence with different charging phases. First, provision is made for the first switch to be open and the second switch to be closed while the DC/DC converter is active. In this case, charging is carried out from the AC voltage connection. As the next step, the first switch is closed, such that the rectifier connects the rechargeable battery to the AC voltage connection via the closed first switch. Here, the DC/DC converter is active and the second switch is open. The DC/DC converter is operated in this case in accordance with a nominal consumer voltage of the consumer on-board electrical system branch, while the rectifier is operated in accordance with a nominal charging voltage that is used to charge the battery (and is specified by a rechargeable battery monitoring device). In this case, the rectifier is operated in a single-phase or multi-phase manner. In the first step, in which the consumer on-board electrical system branch is supplied with power via the DC/DC converter and/or the DC/DC converter charges the rechargeable battery via the closed second switch, this corresponds to DC-isolated charging. In the second step, in which the first switch connects the rectifier to the connection point, the AC voltage connection is DC-connected to the rechargeable battery via the rectifier. This corresponds to a non-DC-isolated charging process. Depending on the specifications of the connected charging station, charging is carried out in a DC-isolating or DC-connected manner, with, apart from that, single-phase and/or three-phase (alternating) charging also being possible.

The first switch (which is then closed) is only charged with DC coupling when the rechargeable battery voltage is greater than the electrical system peak voltage, that is to say greater than the RMS voltage multiplied by the square root of two. In the case of a European power grid, this corresponds to 230 V multiplied by the square root of two. If the voltage of the rechargeable battery is lower, then the first switch is open and the second switch is closed, with the result that the rectifier is connected to the rechargeable battery via the voltage converter. In this case, the voltage converter is connected in a DC-isolating manner. Even with three-phase charging, charging is only carried out in a DC-connected manner via the first switch when the rechargeable battery voltage is greater than the RMS voltage multiplied by the square root of two multiplied by the concatenation factor (for three phases: the square root of 3). In a European grid system, this corresponds to a voltage of 230 V multiplied by the square root of two multiplied by the square root of three, wherein a three-phase system is also assumed. If the voltage of the rechargeable battery is below this voltage, then the first switch is open and the second switch is closed, with the result that the rechargeable battery is connected to the rectifier via the DC/DC converter. These types of charging refer to AC voltage charging via the AC voltage connection.

Between the first switch on the one hand and the DC/DC converter and the rectifier on the other hand, a further DC/DC converter may be provided, which is, for example, a DC-coupling DC/DC converter. Furthermore, a further DC/DC converter, which is in an embodiment a DC-conductive DC/DC converter, is provided between the rechargeable battery and the first switch.

Provision may be made for the rectifier to be capable of feedback, and in an embodiment is in the form of a power factor correction filter or another controllable rectifier as a rectifier. In addition, provision is made for the DC/DC converter (between the second switch and the rectifier) to be capable of feedback. In an embodiment, the rectifier or the power factor correction filter and/or the DC/DC converter are designed to be bidirectional.

During the DC-coupling AC charging, that is to say with the first switch closed and the second switch open, the DC/DC converter is used to supply the consumer on-board electrical system branch. Since the second switch is open, the rechargeable battery may have a different voltage than the consumer on-board electrical system branch. Different nominal voltages are thus provided for the converter and for the rectifier, namely a nominal consumer voltage and a nominal rechargeable battery voltage. At the same time, the open second switch and the DC-isolating DC/DC converter ensure that the Cy capacitors of the consumer on-board electrical system do not affect the AC voltage connection.

As mentioned, the rechargeable battery is in multiple parts and may have a configuration circuit that connects cell groups of the rechargeable battery to one another in parallel or in series. In the same way, the DC/DC converter may also be in multiple parts and consist of two or more DC/DC converter elements, which may be connected in series or in parallel via a configuration circuit (of the converter). In an embodiment, the configuration circuit is provided between these converter elements and the rectifier. The configuration circuit thus relates to the side of the DC/DC converter facing the rectifier and also configures the side of the DC/DC converter facing the rectifier.

In addition to the motor and the inverter, ancillary units come into consideration as consumers or components located there in the consumer on-board vehicle electrical system. An electrical heating device, which may have an actuator, is thus provided in the consumer on-board electrical system. Such an actuator is, for example, a pulse-width-modulating actuator, which controls the averaged power through clocked switching and variation of the on times. Since this pulsing may lead to interference, such an actuator also includes an interference filter, which in turn has Cy capacitors. The heating element and the actuator itself may also have parasitic Cy capacitances. The heating device may be provided to heat a catalytic converter, an interior or a cooling circuit. Furthermore, an electric compressor may be provided as a consumer. This also has an actuator that operates in a pulse-width-modulated manner or operates in a clocked manner, for example an inverter. The actuator and also the compressor itself or the electric machine thereof may also have dedicated, discrete Cy capacitors and/or parasitic Cy capacitances. The DC/DC converter itself may also have a filter, which has dedicated Cy capacitors in the context of a filter on the side facing the consumer on-board electrical system branch.

In addition, a further DC/DC converter is provided as a component or consumer, in a further consumer on-board electrical system branch, which is connected to the connection point or the rechargeable battery. This is a low-voltage DC/DC converter, for instance a buck converter, which is provided for generating a voltage of 12 or 24 V, for example. Here, too, parasitic capacitances may be provided in this further converter and/or a filter having a Cy capacitor (for example as a filter) may be provided.

BRIEF DESCRIPTION OF THE DRAWINGS

The present invention will become more fully understood from the detailed description and the accompanying drawings, wherein:

FIG. 1 is a diagram of an on-board electrical system, according to embodiments of the present invention.

DETAILED DESCRIPTION OF THE PREFERRED EMBODIMENTS

The following description of the preferred embodiment(s) is merely exemplary in nature and is in no way intended to limit the invention, its application, or uses.

FIG. 1 shows an on-board vehicle electrical system BN, which is connected to voltage sources WQ and GQ via connections with the reference signs GA and WA of the on-board vehicle electrical system BN. One of these sources is the AC voltage source WQ, while the other source is the DC current source GQ. Both sources are outside the on-board vehicle electrical system and in an embodiment are stationary.

The on-board vehicle electrical system BN thus includes an AC voltage connection WA and a DC voltage connection GA. The AC voltage connection WA is connected to the rectifier GR via a first disconnecting switch. The DC voltage connection GA is connected via a second disconnecting switch T2 to a connection point VP, to which a rechargeable battery AK is connected. The rectifier GR is connected to the connection point VP via a first switch S1. The rectifier GR thus connects the disconnecting switch T1 to the first switch S1, which in turn connects the rectifier GR to the connection point VP and thus to the rechargeable battery. The first disconnecting switch T1 is thus connected to the first switch S1 via the rectifier GR. The DC voltage connection GA is connected to the connection point VP and to the first switch S1 via the second disconnecting switch T2. The rectifier GR is connected to the second disconnecting switch T2 via the first switch S1.

A DC/DC converter W1, which is a DC-isolating DC/DC converter, is also connected to the first switch S1. The DC/DC converter W1 is connected to the connection point VP via the first switch S1. The DC/DC converter W1 also connects the rectifier GR to a consumer on-board electrical system branch BZ. The DC/DC converter W1 is connected via a second switch S2 to the connection point VP (which is connected to the rechargeable battery AK or which is also connected to the first switch S1). The consumer on-board vehicle electrical system branch BZ is connected to the connection between the second switch S2 and the first converter W1. In other words, the consumer on-board electrical system branch BZ is connected to one side of the first DC/DC converter W1, the second side of the DC/DC converter W1 being connected to the rectifier GR.

A switchable connection V connects the rectifier GR to the connection point VP, this connection V including the first switch S1. If the second switch S2 is open, no DC voltage may reach the rectifier GR or the connections WA or GA in a DC-connected manner. On the one hand, the first DC/DC converter W1 isolates a DC voltage in the consumer on-board electrical system branch BZ from the rectifier GR or from the connections WA, GA, and on the other hand, the second switch S2 disconnects any voltage in the consumer on-board electrical system branch BZ from the connection point VP and thus also from the connections WA, GA and the rectifier GR.

If the consumer on-board electrical system branch BZ therefore includes components with a Cy capacitor, then the DC/DC converter W1 and the second switch S2 are used to isolate the voltage that may be stored therein, with the result that the connections or the rectifier GR are free of a contact voltage that may result, which may be dangerous. The first switch S1 or the connection V enables charging starting from the AC voltage connection WA via the rectifier GR and the first switch S1 to the rechargeable battery AK. In the same way, a connection that also allows feedback is produced. If a voltage adjustment is required, the first switch S1 is open and the second switch S2 closed so that a voltage may reach the connection point VP (via the second switch S2) from the AC voltage connection WA via the rectifier GR and the DC/DC converter W1. The switch S1 is used in this case to DC-isolate the Cy capacitors in the consumer on-board electrical system branch BZ from the AC voltage connection WA. Since the DC/DC converter W1 is DC-isolating, there is also no path for a dangerous contact voltage starting from the Cy capacitances of the consumer on-board electrical system branch BZ via the DC/DC converter W1 to the rectifier GR or the AC voltage connection WA connected to it. In addition, when the second switch S2 is open, on the one hand, energy, as mentioned, is transmitted from the AC voltage connection WA to the rechargeable battery AK, while at the same time voltage is transmitted to the consumer on-board electrical system branch BZ via the DC/DC converter W1. Due to the open second switch S2, the DC/DC converter W1 may provide a different voltage for the consumer on-board electrical system branch BZ than the voltage at the rechargeable battery AK (which is essentially defined by the rectifier GR).

If the DC voltage connection GA is occupied, for example for charging the rechargeable battery AK, then energy is transmitted to the rechargeable battery AK via the disconnecting switch T2 (closed in this case). In the same way, energy is also transmitted in the opposite direction. Either an AC voltage is simultaneously transmitted via the AC voltage connection WA to the consumer on-board electrical system branch BZ (with the first and second switches S1, S2 open), or the first switch S1 is closed and the converter W1, fed by the DC voltage connection GA, supplies power to the consumer on-board electrical system branch BZ by the voltage at the connection point VP or the voltage that is applied to the DC voltage connection GA. Alternatively, the switch S2 may be closed (while the first switch S1 is open), with the result that when the second disconnecting switch T2 is closed, a DC voltage is applied to the DC voltage connection GA, the voltage also being supplied to the consumer on-board electrical system branch BZ via the second switch S2. Here, too, the first switch S1 and the DC/DC converter W1 are used to DC-isolate the Cy capacitors in the consumer on-board electrical system branch BZ from the AC voltage connection.

Finally, it is possible for both disconnecting switches T1 and T2 to be closed so that combined charging may take place. In this case, for example, the switch S1 is closed and the switch S2 is open in order to charge the rechargeable battery via the AC voltage connection and the DC voltage connection WA, GA (while at the same time the consumer on-board electrical system branch BZ is supplied with power via the first DC/DC converter W1). As an alternative, the switch S1 is open while the switch S2 is closed, wherein the DC/DC converter W1 is set up to generate an output voltage that essentially corresponds to the voltage at the DC voltage connection GA, in order to achieve an essentially even distribution of the load on the connections WA and GA.

The AC voltage connection WA is connected to the rectifier GR via the first disconnecting switch T1. The DC voltage connection GA is connected to the connection point VP via the second disconnecting switch T2. The two disconnecting switches T1, T2 are located on different sides of the first switch S1. This also applies to the second switch S2. The DC voltage connection and the AC voltage connection GA, WA are part of the on-board vehicle electrical system BN and are designed as connector elements, for example. These connector elements are designed in accordance with a standard for charging electric vehicles. The connector elements may be part of a common charging socket device.

A consumer on-board electrical system branch BZ with an electric machine M, which is connected via an inverter I to the second switch S2 or the DC/DC converter W1, is illustrated. Further components, that is to say consumers or loads or energy sources, are also illustrated. For example, the consumer on-board electrical system branch BZ may also include a component K, which is designed, in an embodiment, as a heating element, a controllable heating element, an air conditioning compressor or the like. Furthermore, a low-voltage on-board electrical system NV, which is connected to the first converter W1 or the second switch S2 via a second converter W2, may be provided as a component or consumer. The fact that these components have Cy capacitances applied to them is illustrated schematically. In this case, as mentioned, these are designed as filter components and thus also as dedicated capacitances, or the capacitances are present as parasitic Cy capacitances. In this case, the side of the DC/DC converter W1 facing the second switch S2 may also have a Cy capacitance in the form of a filter capacitor. The same applies to the inverter I, the electric machine M, the component K (in an embodiment the actuators thereof) or also to the second DC/DC converter W2. This may also have a side which faces the second switch S2 or the first DC/DC converter W1 and which has parasitic capacitances and/or filter capacitances, which act as Cy capacitance.

For the sake of completeness, a Cy capacitance is also shown symbolically at the rechargeable battery AK, the capacitance being situated beyond the second switch S2, however. If the first switch S1 is closed, the result is a non-DC-isolating connection via the rectifier GR to the AC voltage connection WA and a direct connection to the DC voltage connection GA. However, it is seen that DC-isolating disconnection by an open second switch S2 and the DC-isolating DC/DC converter W1 may disconnect at least the Cy capacitances of the consumer on-board electrical system branch BZ. As a result, the total Cy capacitance acting at the connections GA or WA is low (but not less than the non-disconnectable Cy capacitance of the rechargeable battery AK).

Furthermore, an additional on-board electrical system branch is shown, which includes a component X, this being connected to the connection point VP via a switch S2'. The further second switch S2' is opened and closed like the second switch S2. The Cy capacitances of this additional on-board electrical system branch therefore may be disconnected from the connections such as WA and GA. However, since the first DC/DC converter W1 is not connected to the component X, the component X cannot be supplied with power using the first converter W1. The component X may therefore be a component that does not require a voltage supply even during charging (for example a component that is only active when the vehicle is driving).

A controller C is connected in a controlling manner to the first switch S1, the second switch S2, the additional switch S2', the first DC/DC converter W1 and the rectifier GR, as is symbolically illustrated by the double arrows. As a result, the controller allows a coordinated operation, for example two charging modes, in which the switches S1 and S2 are alternately open and closed and the first switch or the second switch S1, S2 is closed. If the second switch S2 is open, the voltage in the consumer on-board electrical system branch BZ is set in accordance with a consumer voltage setpoint by the control of the first DC/DC converter W1. In addition, by controlling the rectifier GR, the voltage at the connection point VP and thus at the rechargeable battery AK may be specified, which voltage may deviate from the output voltage of the first DC/DC converter W1 when the switch S2 is open. The rectifier GR is thus controlled in accordance with a nominal charging voltage. Furthermore, it is conceivable that the controller C controls the disconnecting switches T1 and T2, at least one of the two switches T1 and T2 being closed when a charging state prevails and both disconnecting switches being open in a driving state. In a traction mode, the controller C controls the second switch S2 in a closed state, while the first switch S1 or the additional switch S2' are controlled in an open state. The converter is also inactive in the traction state, it being possible for this to be controlled by the controller C as well. The controller may be a central controller, or it may be in several parts and, in an embodiment, distributed hierarchically.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An on-board vehicle electrical system, comprising:
   a rechargeable battery;
   a connection point;
   a first switch;
   a second switch, the second switch is connected to the rechargeable battery via the connection point;
   a DC voltage connection, the DC voltage connection is connected directly to the rechargeable battery via the connection point;
   an AC voltage connection, the AC voltage connection is connected to the rechargeable battery via a rectifier and the first switch via the connection point;
   at least one consumer on-board electrical system branch having a Cy capacitance, and which is connected to the rechargeable battery via the second switch;
   a controller, the controller connected in a controlling manner to the first switch and the second switch;
   a first state, and during the first state, the controller controls the first switch in an open state and controls the second switch in a closed state;
   a second state, and during the second state, the controller controls the first switch in a closed state and controls the second switch in an open state; and
   a third state, and during the third state, the controller controls the first switch in an open or closed state and controls the second switch in an open state;
   wherein the rectifier is connected to the rechargeable battery via a DC-isolating DC/DC converter and the second switch.

2. The on-board vehicle electrical system of claim 1, the at least one consumer on-board electrical system branch further comprising a traction drive on-board electrical system branch, which has an electric machine.

3. The on-board vehicle electrical system of claim 1, further comprising:
   a charging state, the controller is able to detect the charging state;
   wherein the controller controls the second switch in an open state when there is the charging state present in order to disconnect the Cy capacitance of the at least one consumer on-board electrical system branch from the DC voltage connection and the AC voltage connection;
   wherein the controller controls the second switch S2 in a closed state when there is no charging state present.

4. The on-board vehicle electrical system of claim 1, wherein the controller is connected to the DC/DC converter in a controlling manner and in the first state, the controller controls the DC/DC converter in accordance with a nominal charging voltage, in the second state, the controller controls the DC/DC converter in accordance with a nominal supply voltage, and in the third state, the controller controls the DC/DC converter in accordance with the nominal supply voltage.

5. The on-board vehicle electrical system of claim 1, the rectifier further comprising a controllable rectifier.

6. The on-board vehicle electrical system of claim 1, the rectifier further comprising a power factor correction filter.

7. The on-board vehicle electrical system of claim 1, wherein the DC/DC converter is connected to the rechargeable battery via the second switch and the rectifier is connected to the rechargeable battery via the first switch.

8. The on-board vehicle electrical system of claim 1, the at least one consumer on-board electrical system branch further comprising an electric traction drive having an electric machine.

9. The on-board vehicle electrical system of claim 1, the rechargeable battery further comprising a high-voltage rechargeable battery.

10. The on-board vehicle electrical system of claim 1, wherein the rechargeable battery is formed in multiple parts and further comprises a configuration circuit by which different cell groups of the rechargeable battery are optionally connected to one another in parallel or in series.

11. The on-board vehicle electrical system of claim 1, further comprising an additional on-board electrical system, having a Cy capacitance, and an additional switch via which the additional on-board electrical system is connected to the connection point.

* * * * *